(12) United States Patent
Tanis (10) Patent No.: US 9,924,732 B2
(45) Date of Patent: Mar. 27, 2018

(54) MACHINE FOR MOULDING SOFT CONFECTIONERY

(71) Applicant: Tanis Confectionery B.V., Oosterhout (NL)

(72) Inventor: Leonard Johannes Tanis, Oosterhout (NL)

(73) Assignee: Tanis Confectionery B.V., Oosterhout (NL)

( * ) Notice: Subject to any disclaimer, the term of this patent is extended or adjusted under 35 U.S.C. 154(b) by 10 days.

(21) Appl. No.: 15/218,422

(22) Filed: Jul. 25, 2016

(65) Prior Publication Data
US 2017/0064976 A1 Mar. 9, 2017

Related U.S. Application Data

(63) Continuation of application No. PCT/NL2015/050618, filed on Sep. 7, 2015.

(51) Int. Cl.
*A23G 3/02* (2006.01)
*A23G 3/34* (2006.01)

(52) U.S. Cl.
CPC ......... *A23G 3/0278* (2013.01); *A23G 3/0025* (2013.01); *A23G 3/0027* (2013.01); *A23G 3/0252* (2013.01); *A23G 3/0257* (2013.01); *A23G 3/0268* (2013.01); *A23G 3/0284* (2013.01)

(58) Field of Classification Search
CPC .. A23G 3/0025; A23G 3/0027; A23G 3/0252; A23G 3/0257; A23G 3/0268; A23G 3/0278; A23G 3/0284
See application file for complete search history.

(56) References Cited

U.S. PATENT DOCUMENTS

| | | | | |
|---|---|---|---|---|
| 1,732,228 A | * | 10/1929 | Greer | ........................ A23G 3/20 198/465.1 |
| 1,894,651 A | * | 1/1933 | Werner | ................ A23G 3/0252 426/515 |
| 2,163,580 A | * | 6/1939 | Bianchi | ................ A23G 3/2023 425/126.1 |
| 2,253,938 A | | 8/1941 | Melody | |

(Continued)

FOREIGN PATENT DOCUMENTS

DE 390888 2/1924
DE 512519 11/1930

(Continued)

OTHER PUBLICATIONS

English Translation for SU1321397 published Jul. 1987.*

(Continued)

*Primary Examiner* — Anthony J Weier
(74) *Attorney, Agent, or Firm* — Swanson & Bratschun, L.L.C.

(57) ABSTRACT

Apparatus, system and method embodiments for molding soft confectionery are included herein include a conveyor system arranged for conveying a plurality of trays in a serial succession, a loading unit arranged for loading the trays onto the conveyor system, a depositing unit arranged for depositing liquid confectionery in mold cavities of at least two trays simultaneously, and an unloading unit arranged for unloading the trays from the conveyor system.

12 Claims, 7 Drawing Sheets

(56) References Cited

U.S. PATENT DOCUMENTS

| | | | | |
|---|---|---|---|---|
| 2,652,789 | A * | 9/1953 | Peters | A23G 3/0252 |
| | | | | 425/440 |
| 2,857,082 | A * | 10/1958 | Perkins | A23G 3/0257 |
| | | | | 141/238 |
| 3,128,800 | A | 4/1964 | Faerber | |
| 6,242,028 | B1 * | 6/2001 | Bean | A23G 3/0252 |
| | | | | 425/259 |
| 2002/0001666 | A1 * | 1/2002 | Klein | A23G 1/22 |
| | | | | 426/661 |
| 2005/0260329 | A1 * | 11/2005 | Yusuf | A23G 3/0008 |
| | | | | 426/660 |
| 2010/0209569 | A1 | 8/2010 | Bertran | |
| 2011/0045155 | A1 * | 2/2011 | Whetstone, Jr. | A23G 1/0093 |
| | | | | 426/524 |
| 2015/0264957 | A1 * | 9/2015 | Chan | A23G 3/0053 |
| | | | | 426/232 |

FOREIGN PATENT DOCUMENTS

| | | | |
|---|---|---|---|
| DE | 102011075602 A1 | | 11/2012 |
| SU | 1107820 | * | 8/1984 |
| SU | 1321397 | * | 7/1987 |

OTHER PUBLICATIONS

English Translation for SU1107820 published Aug. 1984.*
Office Action from corresponding German patent application 102016009014.6 dated Feb. 15, 2017 (with relevant English translation).
International Search Report from PCT/NL2015/050618 dated May 6, 2016.

* cited by examiner

MACHINE FOR MOULDING SOFT CONFECTIONERY

RELATED APPLICATIONS

This application is a continuation application of International Application PCT/NL2015/050618, with an international filing date of Sep. 7, 2015, entitled "Machine and Method for Moulding Soft Confectionery", which is incorporated herein by reference in its entirety.

TECHNICAL FIELD

The present invention relates to the field of moulding soft confectionery. The invention relates to machines for moulding soft confectionery.

BACKGROUND

It is known to manufacture soft confectionery, such as gums and jellies, on an industrial scale using a starch moulding plant, sometimes also referred to as mogul plant. In a starch moulding plant trays are positioned on a conveyor system. Each tray is filled with starch by a filling station. In each tray a plurality of cavities is depressed into the starch bed. A liquid confectionery product is deposited into the cavities and allowed to dry.

Advances have been made in increasing the output capacity of the starch moulding plant, e.g. by increasing throughput speed of trays. Increasing the throughput speed of trays, however, can also lead to increased wear and risk of mechanical failure of the plant, increased spilling and/or contamination of starch, and reduced accuracy of depositing the liquid product.

SUMMARY OF THE EMBODIMENTS

The invention aims to solve at least one of the above problems. The invention also aims to provide an improved machine for producing soft confectionery.

Thereto, according to the invention is provided a machine for moulding soft confectionery. The machine includes a conveyor system arranged for conveying a plurality of trays in a serial succession. The machine includes a loading unit arranged for loading the trays onto the conveyor system. The machine includes a depositing unit arranged for depositing liquid confectionery in mould cavities of at least two trays simultaneously. The machine includes an unloading unit arranged for unloading the trays from the conveyor system. Depositing liquid confectionery in mould cavities of at least two trays simultaneously provides the advantage that at least twice the amount of soft confectionery articles can be deposited within the time required for depositing liquid confectionery in a single tray. Moreover, this also makes it possible to use such machine in a factory that already uses a large quantity of trays without necessitating replacement of these trays. It makes it also possible to use the machine according to the invention side by side with a conventional machine, while allowing use of the same trays in both machines.

The conveyor system is arranged for conveying the plurality of trays in a serial succession. The serial succession of trays may form a row of trays. In the row of trays the trays may be positioned behind each other in a transportation direction of the conveyor system. The conveyor system may be arranged for conveying the plurality of trays in a row. Optionally, the conveyor system includes a single row of trays. Optionally, the conveyor system includes only one row of trays.

Optionally, the conveyor system is arranged for displacing the trays in a stroke-like fashion. Optionally, a stroke length of the movement of the conveyor system is equal to or larger than the combined length of the at least two trays measured in the movement direction of the conveyor system. The length of a tray measured in the movement direction of the conveyor system is herein also referred to as tray length. This provides the advantage the output of the machine can be at least two trays per stroke. Hence the output of the machine, in trays per minute, can be at least twice the output of a machine that moves a trays over a single tray length per stroke when operating at the same stroke frequency. It is also possible to have the machine operate at a stroke frequency that is reduced relative to a prior art machine in which trays are moved over a single tray length per stroke, while still yielding a higher production rate of soft confectionery articles. Alternatively, or additionally, tray advancement acceleration and/or jerk can be reduced. Hence, wear and risk of mechanical failure of the plant, spilling and/or contamination of starch can be reduced. Also accuracy of depositing the liquid confectionery can be increased.

The soft confectionery can e.g. be soft sugar and sugar-free confectionery. It is also possible that the soft confectionery is nutraceutical Confectionery, medicated confectionery or organic confectionery. Thereto the liquid confectionery deposited in the mould cavities may include suitable ingredients.

Optionally the at least two trays in which the liquid soft confectionery is deposited simultaneously are at least two trays from a single row of trays. Optionally, the at least two trays in which the liquid soft confectionery is deposited simultaneously are at least two successive trays within the single row of trays.

The machine may include a filling unit arranged for filling a tray with a moulding powder, such as starch. Optionally the filling unit is arranged for simultaneously filling at least two trays with the moulding powder. Optionally the at least two trays are at least two successive trays. This provides the advantage that also this step in the process can be performed faster.

The machine may include a mould-forming unit arranged for forming the mould cavities of a tray in a moulding powder bed, such as a starch bed, on said tray. The moulding powder bed may be formed on the tray by the filling unit. Optionally, the mould-forming unit is arranged for simultaneously forming the mould cavities of at least two trays. Optionally the at least two trays are at least two successive trays. This provides the advantage that also this step in the process can be performed faster.

Optionally, the machine includes an emptying unit arranged for removing the soft confectionery, and optionally the moulding powder, from a tray. Optionally, the emptying unit is arranged for simultaneously removing the soft confectionery, and optionally the moulding powder, from at least two trays. Optionally the at least two trays are at least two successive trays. This provides the advantage that also this step in the process can be performed faster.

Optionally, the emptying unit is arranged for upturning the tray or trays. Hence, the soft confectionery, and optionally the moulding powder, can easily be removed from the tray and allowed to fall under gravity into a receptacle. Optionally, the emptying unit is arranged for rotating the at least two trays about a non-vertical axis, such as a, substantially, horizontal axis. Optionally, the emptying unit is arranged for rotating the at least two trays more than 90 degrees, e.g. between 90 and 270 degrees, preferably between 135 and 225 degrees, more preferably approximately 180 degrees. Optionally, rotation of the second of the at least two trays starts with a time delay relative to rotation of the first of the at least two trays. Nevertheless, once the second tray starts rotating the first and second trays may rotate simultaneously. This may aid in preventing the at least two trays from colliding during rotation. It is also possible that rotation of the first of the at least two trays starts with a time delay relative to rotation of the second of the at least two trays.

Optionally, the loading unit is arranged for de-stacking the trays from a container, such as a pallet. The trays being de-stacked can contain the dried soft confectionery articles, and optionally the moulding powder. Optionally, the loading unit is arranged for simultaneously loading at least two trays onto the conveyor system.

Optionally, the unloading unit is arranged for stacking the trays onto a container, such as a pallet. The trays being stacked can contain the drying soft confectionery articles, and optionally the moulding powder. Optionally, the unloading unit is arranged for simultaneously unloading at least two trays from the conveyor system.

Optionally, the machine is arranged such that each processing unit arranged for processing trays is arranged for processing at least two trays simultaneously.

Optionally, the machine further includes a plurality of trays.

The invention also relates to a method for moulding soft confectionery. The method includes placing trays on a conveyor system, so as to form a serial succession of trays. The method includes depositing liquid confectionery in mould cavities of at least two trays simultaneously. Optionally the at least two trays are at least two successive trays.

Optionally, the method includes displacing the trays in a stroke-like fashion. Optionally, a stroke length of the movement of the conveyor system is equal to or larger than the combined length of the at least two trays measured in the movement direction of the conveyor system.

Optionally, the method includes, preferably simultaneously, filling at least two trays with a moulding powder, such as starch.

Optionally, the method includes, preferably simultaneously, forming the mould cavities of at least two trays in a moulding powder bed, such as a starch bed, on said trays.

Optionally, the method includes, preferably simultaneously, removing the soft confectionery, and optionally the moulding powder, from at least two trays. Optionally, the removing includes upturning the trays.

Optionally, the method includes stacking trays including drying confectionery from the conveyor system onto a container, such as a pallet.

Optionally, the method includes de-stacking trays including dried confectionery from a container, such as a pallet, onto the conveyor system.

It will be appreciated that all features and options mentioned in view of the method apply equally to the machine and vice versa.

It will be appreciated that any one or more of the above options can be combined.

BRIEF DESCRIPTION OF THE DRAWINGS

Embodiments of the present invention will now be described in detail with reference to the accompanying drawings in which.

DETAILED DESCRIPTION

Figure 1:
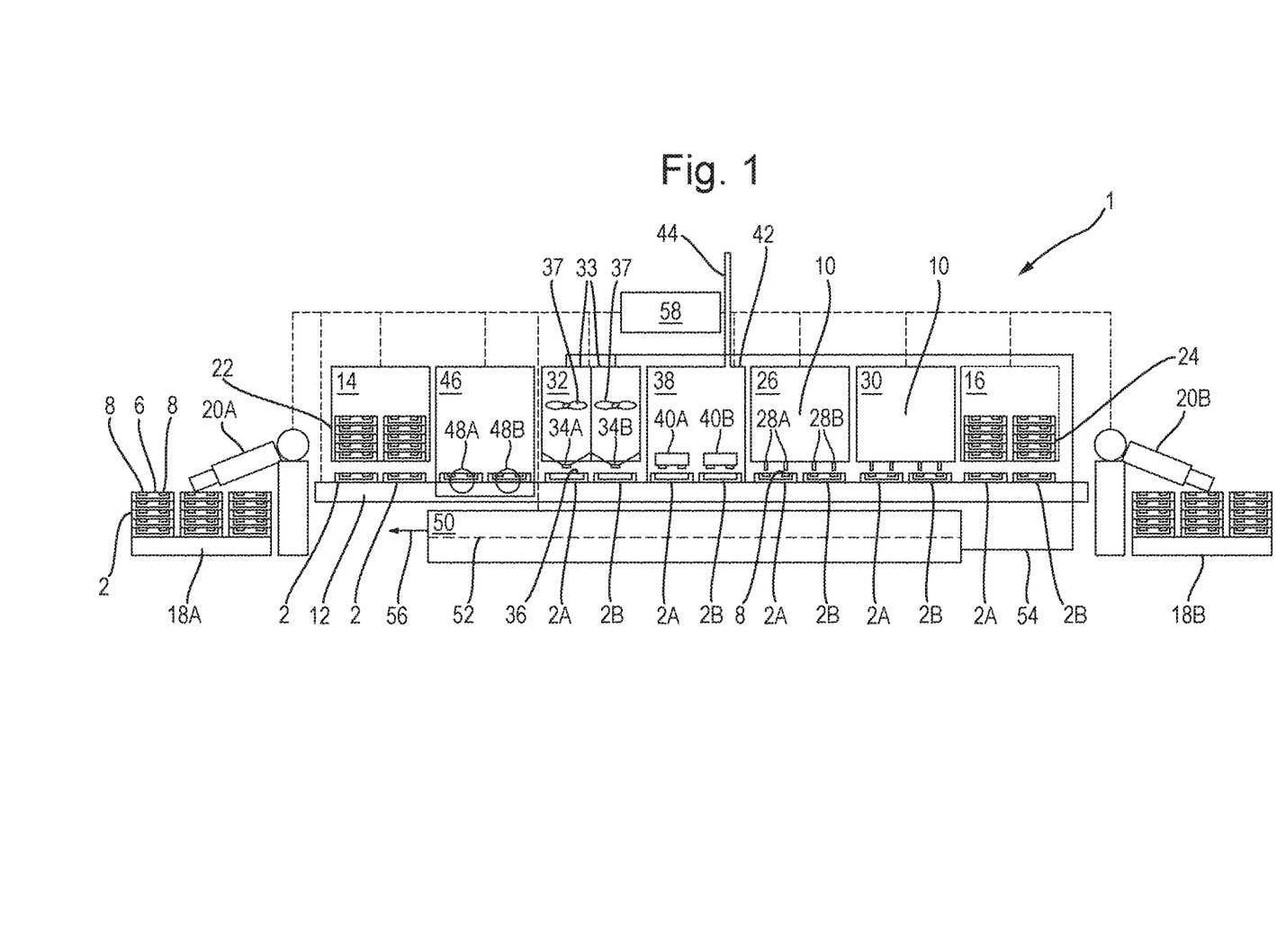
FIG. 1 is a schematic representation of an example of a machine.

FIG. 1 shows a schematic representation of a machine 1 for moulding soft confectionery, e.g. gums and/or jellies. In general the machine of FIG. 1 functions as follows. In this example the soft confectionery is moulded on trays 2. FIG. 3 shows an example of two trays stacked on top of each other. Each tray 2 is provided with a bed 6 of moulding powder, here moulding starch. In the bed 6 of moulding powder one or more mould cavities 8 are formed as will be described below. Liquid confectionery 10 is poured into the mould cavities 8 and allowed to dry.

The trays in this example are fiber glass trays, with outside dimensions in the range of 790-850 mm×350-430 mm×35-75 mm. It will be appreciated that such trays are normally used in standard mogul plants.

The machine 1 includes a conveyor system 12 arranged for conveying a plurality of trays 2 in a serial succession. In FIG. 1 the trays 2 can be seen as forming a single file line of trays. In FIG. 1 the trays 2 form a single row. In FIG. 1 the conveyor system 12 transports only one row of trays 2. In this example the conveyor system 12 is a walking beam that moves the trays in strokes. The walking beam may use clamps arranged for engaging and releasing the tray 2. Engaging and releasing of the clamps here is actuated by a revolving movement of the beam.

The machine 1 includes a loading unit 14 arranged for loading the trays 2 onto the conveyor system 12. The machine 1 also includes an unloading unit 16 arranged for unloading the trays 2 from the conveyor system 12. In this example, the loading unit 14 is arranged for de-stacking the trays 2 from a first container 18A, here a pallet. In this example, the unloading unit 16 is arranged for stacking the trays 2 onto a second container 18B, here a similar pallet as the first container 18A.

In FIG. 1, the loading unit 14 includes a first spherical robot 20A. The first spherical robot 20A is arranged for picking up a stack of trays 2 from the first container 18A and placing it in a magazine 22 of the machine 1. Here the magazine 22 is arranged for holding two stacks of trays 2 side by side. In this example the magazine 22 includes an actuated clamp system for discharging the trays 2 onto the conveyor system 12 by gravity. The magazine 22 places two trays onto the conveyor system simultaneously. It will be appreciated that the first spherical robot 20A can be programmed to pick up a stack of trays 2 from a plurality of locations on the first container 18A without necessitating moving the first container 18A. Use of a robot provides the advantage of less individual moving parts that have to be synchronized. Also stacks of trays can be well aligned by the robot.

In FIG. 1, the unloading unit 16 includes stacker 24 for stacking trays 2. The stacker 24 includes an actuated clamp system for picking up trays 2 from the conveyor system 12 and placing them in stacks. The stacker 24 picks up two trays simultaneously. Here the stacker 24 is arranged for simultaneously forming two stacks of trays 2 side by side. The unloading unit 16 further includes a second spherical robot 20B. The second spherical robot 20B is arranged for picking up a stack of trays 2 from the stacker 24 and placing it on the second container 18B. It will be appreciated that the second spherical robot 20B can be programmed to place a stack of trays 2 on a plurality of locations on the second container 18B without necessitating moving the second container 18B.

In this example, the machine 1 includes a first depositing unit 26 arranged for depositing liquid confectionery 10 in the mould cavities 8 of at least two trays 2 simultaneously. Here two adjacent trays 2 on the conveyor system 12 are positioned at the depositing unit 26 for simultaneous depositing of the liquid confectionery 10. The first depositing unit 26 includes a first plurality of nozzles 28A and a second plurality of nozzles 28B. The first and second pluralities of nozzles 28A, 28B are spaced apart in a travelling direction of the trays 2 on the conveyor system 12. The first plurality of nozzles 28A deposits the liquid confectionery 10 in the mould cavities 8 of a first tray 2A. The second plurality of nozzles 28B deposits the liquid confectionery 10 in the mould cavities 8 of a second tray 2B. In this example, the first depositing unit 26 is arranged for pumping the liquid confectionery 10 out of the first plurality of nozzles 28A and the second plurality of nozzles 28B simultaneously. The first depositing unit 26 may include a weighing platform (not shown) for weighing the trays 2. The acquired weight information can be used to track and control the amount of liquid soft confectionery deposited.

Figure 9:
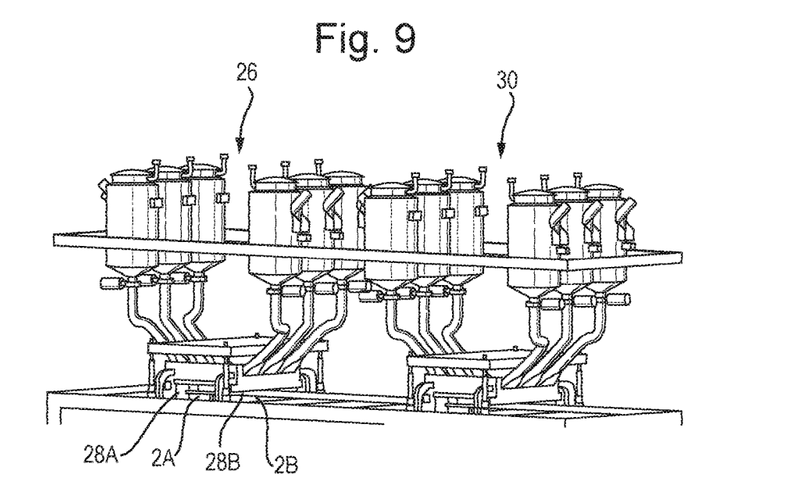
FIG. 9 is a schematic view of an example of a filling unit.

It is noted that in this example the machine 1 further includes a second depositing unit 30 of similar construction for depositing liquid confectionery 10 in the mould cavities 8 of at least two trays 2 simultaneously. The first depositing unit 26 may be arranged for depositing a liquid confectionery different from the liquid confectionery deposited by the second depositing unit 30. For example the colour, flavour, or texture of the two liquid confectioneries may be different. FIG. 9 shows a schematic representation of an example of a first and second depositing unit 26, 30.

Figure 6:
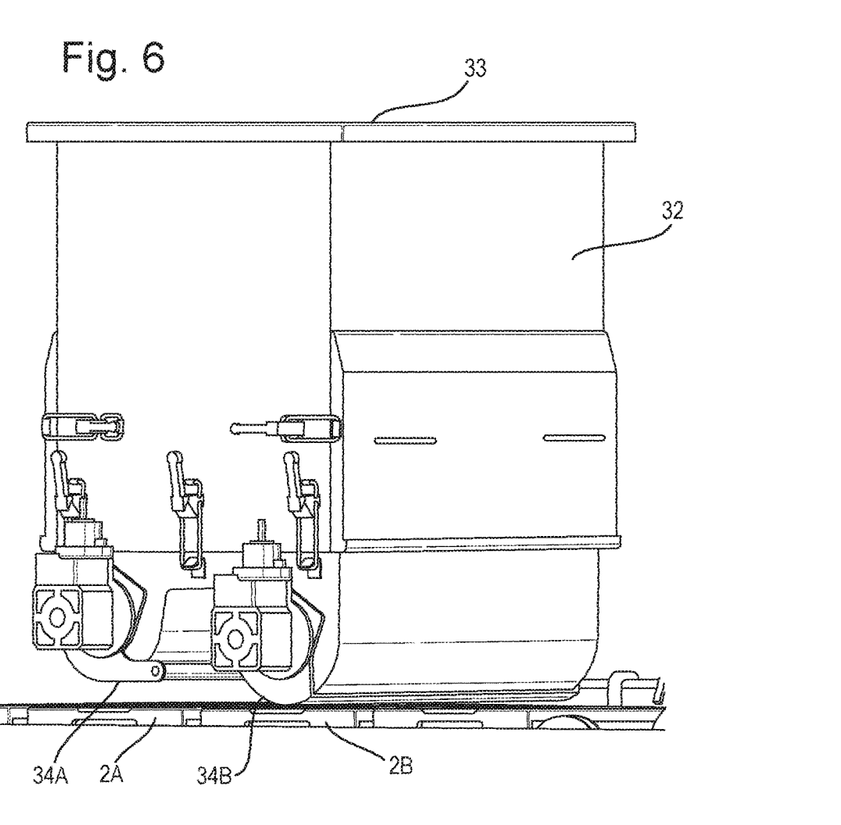
FIG. 6 is a schematic view of an example of a filling unit.

In FIG. 1, the machine 1 includes a filling unit 32 arranged for filling trays 2 with a moulding powder, here moulding starch. In this example, the filling unit 32 includes a double hopper 33. The double hopper 32 is provided with a first gate valve 34A and a second gate valve 34B. The first and second gate valves 34A, 34B are spaced apart in a travelling direction of the trays 2 on the conveyor system. The first gate valve 34A is positioned over a first tray 2A. The second gate valve is positioned over a second tray 2B. The moulding powder forms a moulding powder bed 36 in the trays 2. The hoppers are equipped with stirring devices 37 to avoid bridging of the moulding powder. FIG. 6 shows a schematic representation of an example of a filling unit 32.

Figure 8:
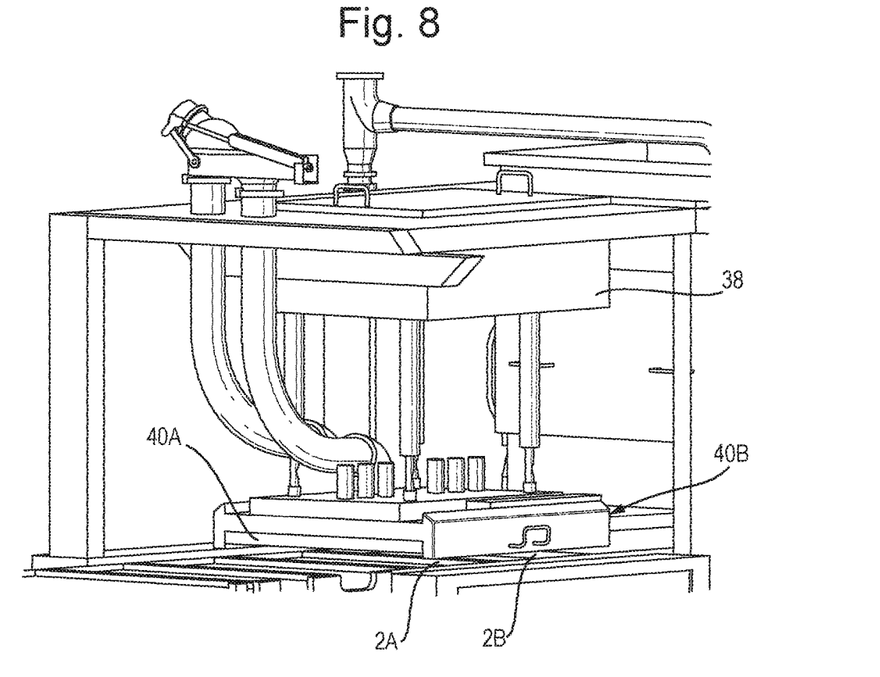
FIG. 8 is a schematic view of an example of a mould-forming unit.

In FIG. 1, the machine 1 includes a mould-forming unit 38 arranged for forming the mould cavities 8. In this example, the mould-forming unit 38 includes a first template 40A and a second template 40B. The templates 40A, 40B include protrusions in the form of positive shapes of the to-be-produced soft confectionery articles. The first template 40A is positioned over a first tray 2A to be pressed into the moulding powder bed 36 for forming the mould cavities 8 as negative shapes of the to-be-produced soft confectionery articles. The second template 40B is positioned over a second tray 2B to be pressed into the moulding powder bed 36 for forming the mould cavities 8 as negative shapes of the to-be-produced soft confectionery articles. The mould-forming unit includes a dust cover 42 and a suction system 44 for removing airborne moulding powder. FIG. 8 shows a schematic representation of an example of a mould-forming unit 38.

Figure 5:
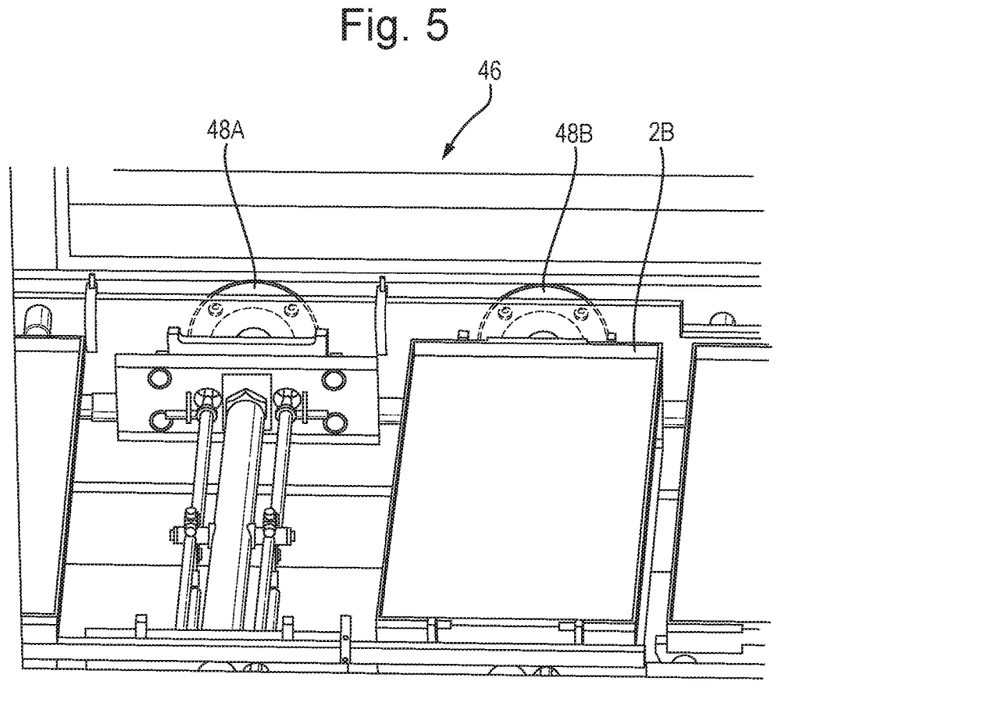
FIG. 5 is a schematic view of an example of part of an emptying unit.

In FIG. 1, the machine 1 includes an emptying unit 46. Here the empting unit includes a first rotation unit 48A for rotating a first tray 2A and a second rotation unit 48B for rotating a second tray 2B. The first and second rotation units 48A, 48B each include a clamping mechanism for engaging the tray and a rotation mechanism for rotating the tray about a horizontal axis. The first and second rotation units 48A, 48B each include a servo drive system. FIG. 5 shows a schematic representation of an example of part of an emptying unit 46.

Figure 7:
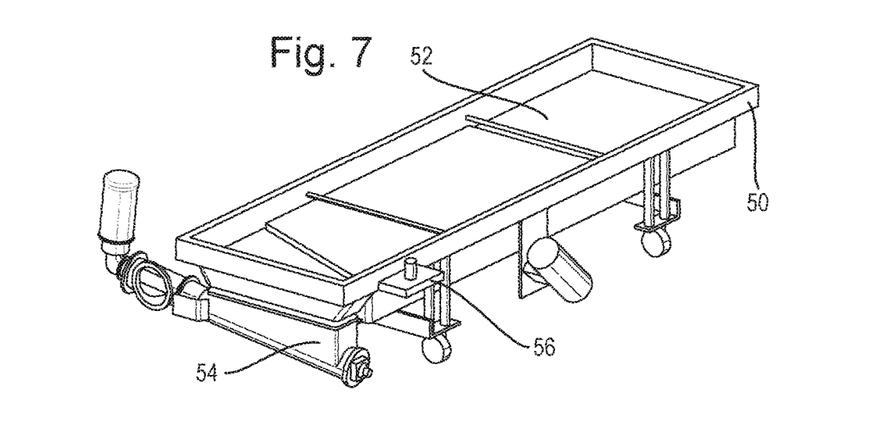
FIG. 7 is a schematic view of an example of a collector.

The machine 1 includes a collector 50. The collector 50 is positioned underneath the emptying unit 46 and is arranged for receiving soft confectionery articles and moulding powder. The collector 50 includes a separator 52 for separating soft confectionery articles from the moulding powder. Here the separator includes a substantially horizontal vibrating sieve deck. The collector also includes a feeding unit 54 for feeding the moulding powder back to the filling unit 32 optionally via a moulding powder conditioning system (not shown). The soft confectionery articles are fed to an output 56 for further processing. In this example, the collector 50 is also positioned underneath the mould-forming unit 38 so as to receive any spilled moulding powder. FIG. 7 shows a schematic view of an example of a collector 50.

The machine 1 further includes a control unit 58. The control unit here is arranged for controlling the conveyor system 12, the loading unit 14, the unloading unit 16, the first depositing unit 26, the second depositing unit 30, the filling unit 32, the mould-forming unit 38, the emptying unit 46, and the collector 50.

The machine 1 as described above can be used as follows for moulding soft confectionery.

A first container 18A containing a plurality of stacks of trays 2 is presented to the machine 1. These trays may already contain solidified soft confectionery articles and moulding powder, resulting from previous moulding. The first spherical robot 20A picks up a first stack of trays from the first container 18A and places this in the magazine 22. Subsequently, the first spherical robot 20A picks up a second stack of trays from the first container 18A and places this in the magazine 22 beside the first stack of trays 2. Once the first container 18A is completely de-stacked it may be transported to the unloading unit 16 and used to stack trays with fresh deposited soft confectionery articles.

The magazine 22 simultaneously releases the lowermost trays from both stacks onto the conveyor system 12. The conveyor system 12 displaces these two trays 2 in a stroke-like fashion in the direction of the unloading unit. The stroke length of the movement of the conveyor system 12 is at least two tray lengths. The stroke length may e.g. be equal to two tray lengths plus two times a gap length between two trays on the conveyor system 12.

From the loading unit 14 the two trays are transported, in said stroke-like fashion, to the emptying unit 46. The first and second rotation units 48A, 48B rotate the respective trays 2A, 2B over 180 degrees. Thereby the solidified soft confectionery articles and moulding powder are emptied into the collector 50. The moulding powder is returned to the filling unit 32. The soft confectionery articles are fed to the output 56 for further processing. In this example, the control unit 58 controls the first rotation unit 48A and the second rotation unit 48B separately. In this example, the first rotation unit 48A is controlled to start rotating earlier than the second rotation unit 48B to avoid collision of the first and second trays 2A, 2B. It will be appreciated that the first and second rotation units 48A, 48B, are active simultaneously for a large proportion of their rotation time, e.g. more than 80% of the rotation time, preferably more than 90% of the rotation time.

The first and second rotation units 48A, 48B rotate the two trays 2A, 2B back to their upright positions. The trays 2A, 2B are now empty and ready to be refilled. It will be appreciated that optionally the emptied trays may be cleaned. Thereto, an optional cleaning unit may be integrated into the emptying unit 32, or interposed between the emptying unit 46 and the filling unit 32.

Figure 3A:
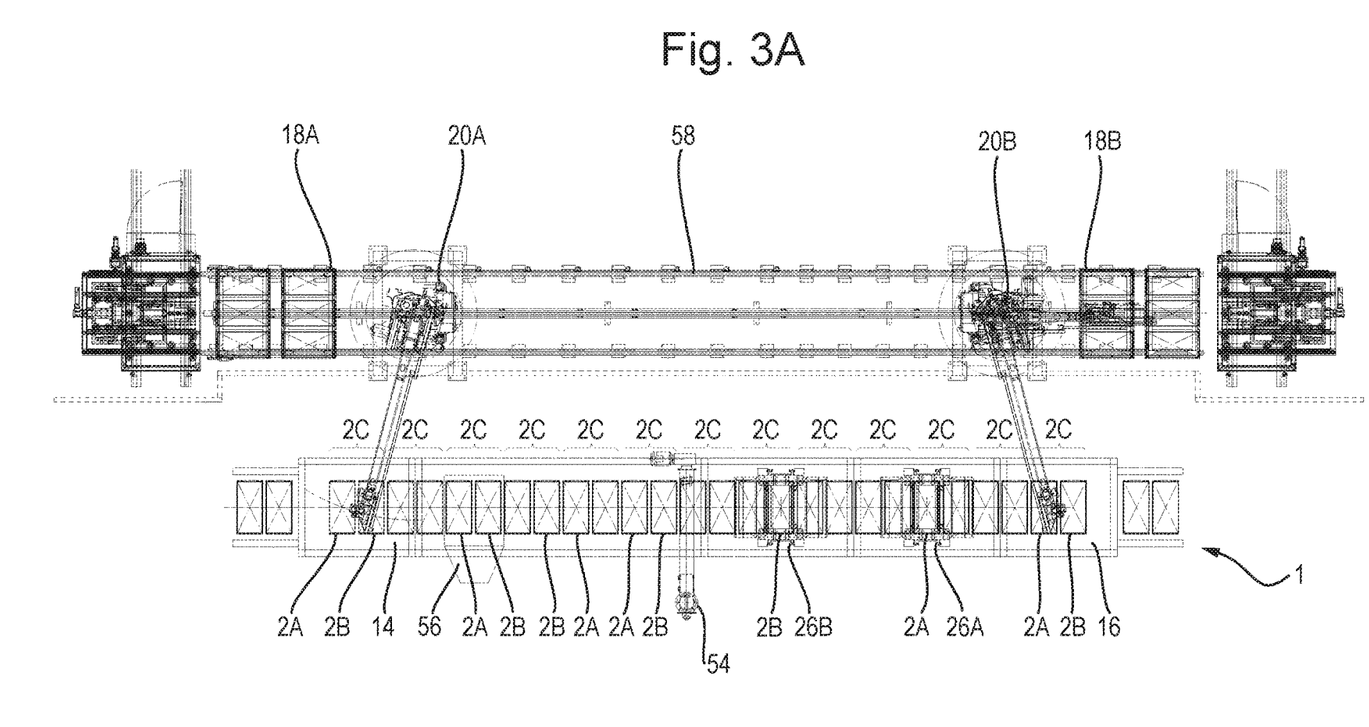
FIG. 3A is a top view of a schematic representation of an example of a machine.
Figure 3B:
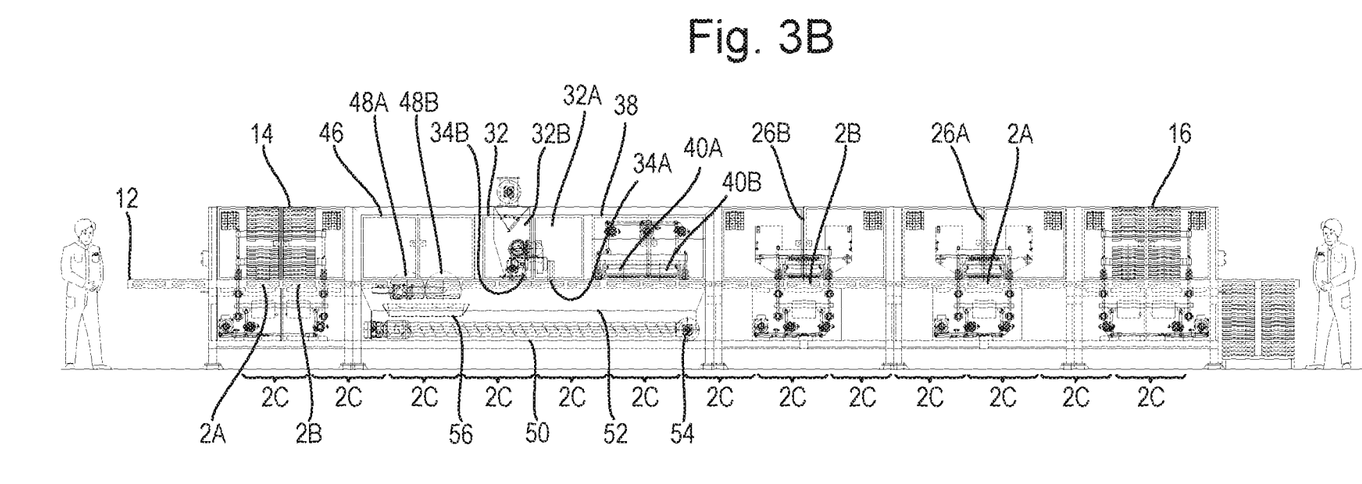
FIG. 3B is a side view of a schematic representation of the machine of FIG. 3A.
Figure 4:
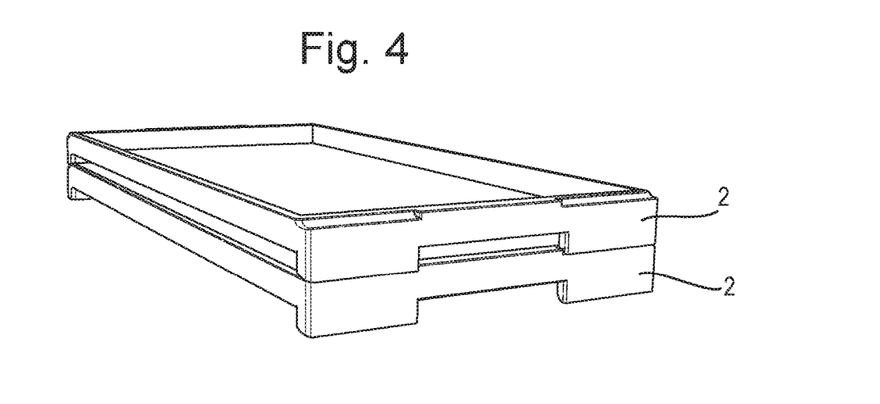
FIG. 4 is an example of a stack of two trays.

It will be appreciated that while the emptying unit 46 operates on the two trays 2A, 2B, the loading unit 14 may release the next lowermost trays from both stacks onto the conveyor system 12. These two trays are ready to be moved to the emptying unit 46 in the next movement stroke. It is thus possible that during normal operation pairs of trays are moved from each processing unit to the next processing unit simultaneously. Then, the conveyor system 12 is fully loaded with a row of trays from the loading unit 14 to the unloading unit 16. It is noted that FIGS. 3a and 3b show an example in which the conveyor system 12 is fully loaded with a row of trays from the loading unit 14 to the unloading unit 16.

From the emptying unit 46 the two trays are transported, in said stroke-like fashion, to the filling unit 32. The first gate valve 34A and the second gate valve 34B are opened for filling the respective trays 2A, 2B and the moulding powder forms the moulding powder beds 36 in the trays 2A, 2B. In this example, the controller 58 controls the first and second gate valves 34A, 34B to open and close simultaneously.

From the filling unit 32 the two trays are transported, in said stroke-like fashion, to the mould-forming unit 38. The first template 40A is pressed into the moulding powder bed 36 for forming the mould cavities 8 of the first tray 2A. The second template 40B is pressed into the moulding powder bed 36 for forming the mould cavities 8 of the second tray 2B. In this example, the controller 58 controls the mould-forming unit such that the movement of the first and second templates 40A, 40B is simultaneous. Now the two trays 2A, 2B are both provided with the mould cavities.

From the mould-forming unit 38 the two trays are transported, in said stroke-like fashion, to the first depositing unit 26. The first plurality of nozzles 28A deposits the liquid confectionery 10 in the mould cavities 8 of a first tray 2A. The second plurality of nozzles 28B deposits the liquid confectionery 10 in the mould cavities 8 of a second tray 2B. In this example, the control unit 58 controls the first depositing unit 26 for pumping the liquid confectionery 10 out of the first plurality of nozzles 28A and the second plurality of nozzles 28B simultaneously.

From the first depositing unit 26 the two trays are transported, in said stroke-like fashion, to the second depositing unit 30. In the second depositing unit too a first plurality of nozzles deposits the liquid confectionery 10 in the mould cavities 8 of the first tray 2A, and a second plurality of nozzles deposits the liquid confectionery 10 in the mould cavities 8 of the second tray 2B. In this example, the control unit 58 controls the second depositing unit 30 for pumping the liquid confectionery 10 out of the first plurality of nozzles and the second plurality of nozzles simultaneously.

From the second depositing unit 30 the two trays are transported, in said stroke-like fashion, to the unloading unit 16. The stacker 24 picks up two trays 2A, 2B from the conveyor system 12 and places them in two stacks. The second spherical robot 20B picks up a first stack of trays 2 from the stacker 24 and places it on the second container 18B. The second spherical robot 20B picks up a second stack of trays 2 from the stacker 24 and places it on the second container 18B too. Once the second container 18B is completely filled it may be transported to the loading unit 14 and used to de-stack trays with solidified soft confectionery articles into the magazine 22. It will be appreciated that it is possible that the second container 18B may be placed in a waiting area for allowing fresh deposited soft confectionery articles to solidify before loading into the machine 1.

In this example, the containers 18A, 18B are moved between the loading unit and the unloading unit beside the depositing units 26, 30. In some prior art machines, the containers are moved underneath the conveyor system. The present configuration has the advantage of better access to the depositing units because the tray level of the machine can be lower. Another advantage is better hygiene because the containers do not risk contamination underneath the depositing units. Moreover, the bottom of the depositing units can be closed.

Figure 2:
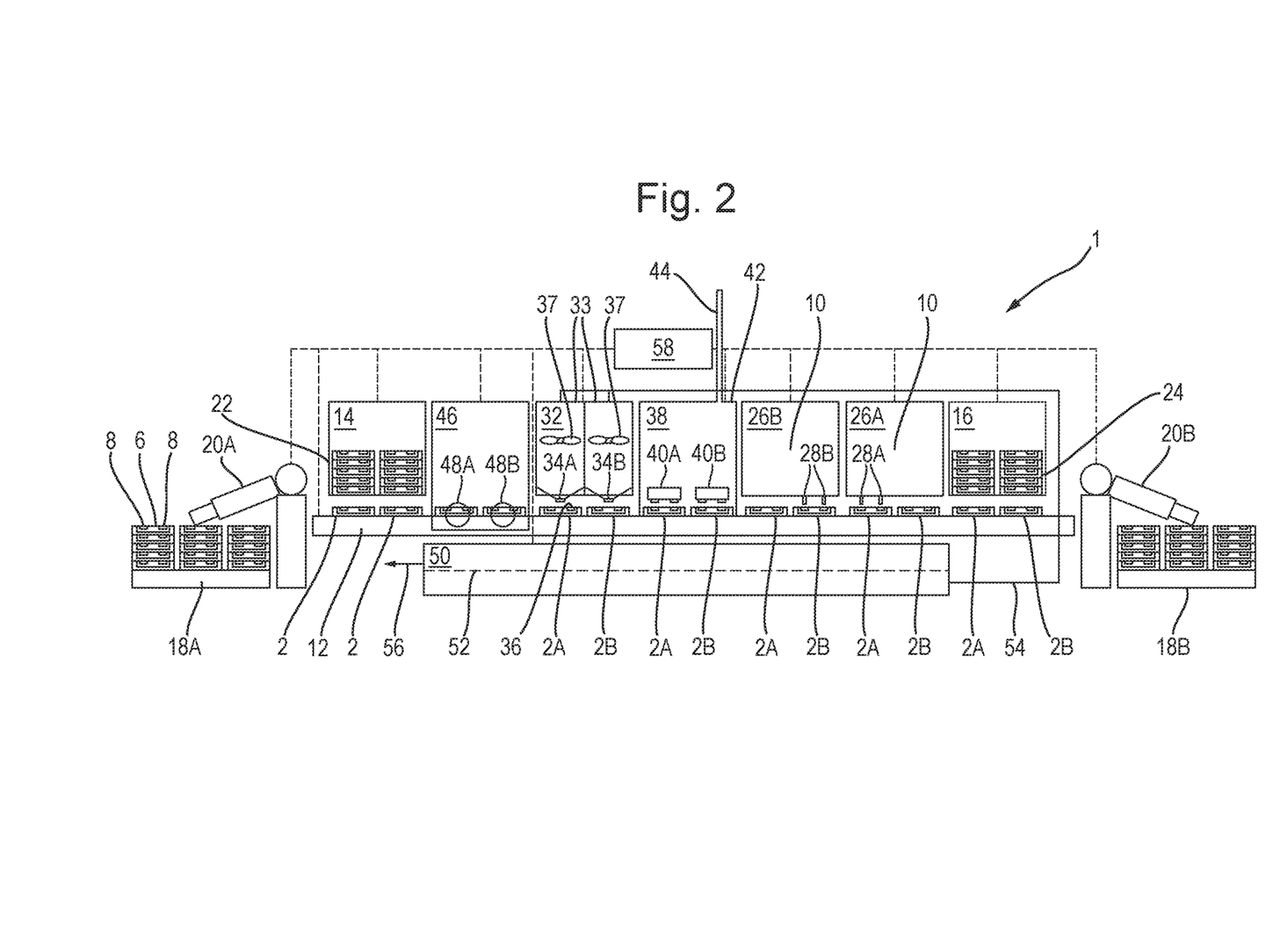
FIG. 2 is a schematic representation of an example of a machine.

FIG. 2 shows a schematic representation of a machine 1 for moulding soft confectionery, e.g. gums and/or jellies. The machine 1 in the example of FIG. 2 is similar to the machine shown in FIG. 1. The main difference is in the depositing units.

In this example, the machine 1 includes a primary depositing unit 26B and a secondary depositing unit 26A. The primary depositing unit 26B is arranged for depositing liquid confectionery 10 in the mould cavities 8 of a single tray. The primary depositing unit 26 includes a plurality of nozzles 28B. The nozzles 28B deposit the liquid confectionery 10 in the mould cavities 8 of a single tray, in this example the second tray 2B. The primary depositing unit 26B may include a weighing platform (not shown) for weighing the tray being filled, or both trays. The acquired weight information can be used to track and control the amount of liquid soft confectionery deposited.

In this example, the secondary depositing unit 26A is arranged for depositing liquid confectionery 10 in the mould cavities 8 of a single tray. The secondary depositing unit 26A includes a plurality of nozzles 28A. The nozzles 28A deposit the liquid confectionery 10 in the mould cavities 8 of a single tray, in this example the first tray 2A. The secondary depositing unit 26A may include a weighing platform (not shown) for weighing the tray being filled, or both trays. The acquired weight information can be used to track and control the amount of liquid soft confectionery deposited.

The machine 1 of FIG. 2 can be operated as follows for moulding soft confectionery.

Trays are positioned in the magazine 22 as described with respect to FIG. 1 above. A pair of trays 2A, 2B is transported by the conveyor system 12 from the loading unit 14 to the emptying unit 46. The pair of trays 2A, 2B is transported from the emptying unit 36 to the filling unit 32. The pair of trays 2A, 2B is transported from the filling unit 32 to the mould-forming unit 38. The pair of trays 2A, 2B is transported from the mould-forming unit 38 to the first depositing unit 26. The In this example the transport is in a stroke-like fashion. The stroke length of the movement of the conveyor system 12 is at least two tray lengths. The loading unit 14, the emptying unit 46, the filling unit 32 and the mould-forming unit 38 operate as described with respect to FIG. 1.

When the pair of trays has arrived at the primary depositing unit 26B, the nozzles 28B deposit the liquid confectionery 10 in the mould cavities 8 of a single tray, in this example the second tray 2B. The primary depositing unit 26B does not deposit the liquid confectionery 10 in the mould cavities of the other tray 2A of the pair of trays 2A, 2B.

From the primary depositing unit 26B the two trays 2A, 2B are transported, in said stroke-like fashion, to the secondary depositing unit 26A. The nozzles 28A deposit the liquid confectionery 10 in the mould cavities 8 of a single tray, viz the tray not filled by the first depositing unit 26, here the first tray 2B.

In this example, the control unit 58 controls the primary depositing unit 26B and the secondary depositing unit 26A for pumping the liquid confectionery 10 out of the nozzles 28B and the nozzles 28A simultaneously. Thus, the primary depositing unit 26B and the secondary depositing unit 26A together form a first depositing unit 26 arranged for depositing liquid confectionery in mould cavities of at least two trays 2A, 2B simultaneously.

Each depositing unit 26A, 26B depositing liquid soft confectionery in a single tray provides the advantage that a prior art depositing unit can be used that is arranged for depositing liquid soft confectionery in one tray at a time. By synchronizing the primary depositing unit 26B and the secondary depositing unit 26A still the advantage is obtained that the liquid soft confectionery is deposited in the two trays 2A, 2B simultaneously. Hence, the trays can be transported in a stroke-like fashion wherein the stroke length is at least two tray lengths measured in the movement direction of the conveyor system 12.

From the secondary depositing unit 26A the two trays 2A, 2B are transported, in said stroke-like fashion, to the unloading unit 16. The trays are loaded onto the second container 18B as described above with respect to FIG. 1.

It will be appreciated that the machine 1 of FIG. 2 can also include a second primary depositing unit and a second secondary depositing unit. These further depositing units can perform the function of the second depositing unit 30 of the machine in FIG. 1, e.g. deposit soft confectionery of a different colour, flavour, or texture.

FIGS. 3a and 3b shows a top view and side view, respectively, of a machine 1 similar to the machine shown in FIG. 2. In the top plan view of FIG. 3a it can be seen that in this example the tray length, i.e. the length of a tray measured in the movement direction of the conveyor system 12, is smaller than a width of the tray measured orthogonal to the movement direction of the conveyor system. Also can be seen there is a gap between each two successive trays in the row of trays.

It is noted that FIGS. 3a and 3b show an example in which the conveyor system 12 is fully loaded with a row of trays from the loading unit 14 to the unloading unit 16. The trays are moved in a stroke-like fashion. The stroke length is equal to two times the tray length plus two times the gap length. The trays are operated on in pairs 2C. For example, the loading unit 14, the emptying unit 46, the mould-forming unit 36 and the unloading unit 16 each simultaneously operate on two successive trays 2A, 2B of the same pair. It is noted that the primary depositing unit 26B and the secondary depositing unit 26A simultaneously operate on two trays that are spaced apart within the row of trays (there being intermediate trays not being operated on) as explained with respect to FIG. 2. In this example, the filling unit 32 includes a primary filling unit 32B and a secondary filling unit 32A. The primary filling unit 32B and the secondary filling unit 32A operate on two successive trays in the row of trays. However, in this example the primary filling unit 32B operates on the second tray of one pair of trays and the secondary filling unit operates on a first tray 2A of an adjacent pair of trays. This provides the advantage of providing extra room for the filling unit 32 in the movement direction of the conveyor system 12.

As described in the examples, the trays 2 are processed in pairs and transported at a stroke length of at least two tray lengths. The processing can be by one or more of the loading unit 14, the unloading unit 16, the first depositing unit 26, the second depositing unit 30, the filling unit 32, the mould-forming unit 38, and the emptying unit 46. Transporting the trays at a stroke length of at least two tray lengths and processing the trays in pairs could provide an increase of machine output by a factor of two. In an embodiment, however, the stroke frequency is lowered relative to a stroke frequency of trays in a machine in which the trays are transported over approximately one tray length per stroke and processed individually. This may provide additional advantages. The stroke frequency may e.g. be chosen such that the throughput of the machine is between 30 and 60 trays per minute, e.g. between 40 and 50 trays per minute, such as 45 trays per minute, for trays with outside dimensions with a first horizontal dimension of 790-850 mm a second, orthogonal, horizontal dimension of 350-430 mm and a height of 35-75 mm.

Transporting trays at a stroke length of at least two tray lengths and processing the trays in pairs, possibly at reduced stroke frequency, can provide the following advantages over transporting trays at a stroke length of approximately one tray length and processing individual trays of like dimensions. Transporting trays at a stroke length of at least two tray lengths and processing the trays in pairs allows more time for tray de-stacking and/or stacking while increasing machine output. Transporting trays at a stroke length of at least two tray lengths and processing the trays in pairs allows smoother handling and/or transport of the trays in the machine while increasing machine output. Transporting trays at a stroke length of at least two tray lengths and processing the trays in pairs allows smoother printing of shapes into the powder filled trays while increasing machine output. Transporting trays at a stroke length of at least two tray lengths and processing the trays in pairs allows more time for and better cleaning of the trays while increasing machine output. Transporting trays at a stroke length of at least two tray lengths and processing the trays in pairs allows less dust forming, cleaner operation (less moulding powder contamination) while increasing machine output. Transporting trays at a stroke length of at least two tray lengths and processing the trays in pairs allows less wear and tear on the machine while increasing machine output. Transporting trays at a stroke length of at least two tray lengths and processing the trays in pairs allows accurate depositing of liquid soft confectionery into the trays, which may be specifically important in nutraceutical, medicated and organic confectionery, while increasing machine output. Transporting trays at a stroke length of at least two tray lengths and processing the trays in pairs allows less tailing of liquid soft confectionery during depositing and therefore less or no contamination while increasing machine output. Transporting trays at a stroke length of at least two tray lengths and processing the trays in pairs allows more time for tray discharging while increasing machine output. Transporting trays at a stroke length of at least two tray lengths and processing the trays in pairs allows for a more reliable machine, with a higher efficiency on real production time than prior art machines.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

It will be appreciated that the control unit can be embodied as dedicated electronic circuits, possibly including software code portions. The control unit can also be embodied as software code portions executed on, and e.g. stored in, a memory of, a programmable apparatus such as a computer, tablet or smartphone.

However, other modifications, variations, and alternatives are also possible. The specifications, drawings and examples are, accordingly, to be regarded in an illustrative sense rather than in a restrictive sense.

It is for instance possible that the machine has a modular build up. In the machine, e.g. along the conveyor system, room may be foreseen for additional modules such as a visual inspection unit, a weight checking unit and/or a tray cleaning unit.

The empty container transport between the loading unit and the unloading unit can be done over a rail system 58, e.g. with a pushing mechanism.

In the example of FIG. 1, the loading unit, the unloading unit, the first depositing unit, the second depositing unit, the filling unit, the mould-forming unit, and the emptying unit each process two adjacent trays simultaneously. It is also possible that said units process two trays simultaneously while not processing one or more trays positioned between the two trays being processed.

In the examples, the loading unit, the unloading unit, the first depositing unit, the second depositing unit, the filling unit, and the mould-forming unit process two trays simultaneously while starting processing of each of the two trays at the same time. The emptying unit processes two trays simultaneously while starting processing (rotating) of the one tray delayed with respect to processing (rotating) of the other tray. It will be appreciated that it is also possible that the loading unit, the unloading unit, the first depositing unit, the second depositing unit, the filling unit, and the mould-forming unit process two trays simultaneously while starting processing of the one tray delayed with respect to processing of the other tray.

In the example, the trays are processed in pairs, while being transported over at least two tray lengths per stroke. It is also possible to process the trays in groups of more than two trays, such as three, four, five or six trays. When processing the trays in a group of three trays, the trays are preferably transported over at least three tray lengths per stroke. When processing the trays in a group of four trays, the trays are preferably transported over at least four tray lengths per stroke, etc. Generally, the stroke length of the conveyor system is preferably equal to at least N times the tray length (plus gap length), when processing the trays in a group of N trays. Generally, when processing the trays in a group of a predetermined number of trays the stroke length of the conveyor system is preferably equal to at least said predetermined number times the tray length (plus gap length).

In the examples the machine includes two depositing units. It will be appreciated that it is also possible that the machine includes a single depositing unit, or more than two depositing units. The system can e.g. include three, four, five or six depositing units. In the examples the depositing unit is arranged for depositing liquid soft confectionery in two trays simultaneously. It is also possible that a depositing unit is arranged for simultaneously depositing liquid soft confectionery in three, four, five or six trays. Then the stroke length is preferably respectively three, four, five or six times the tray length (plus gap length).

For the purpose of clarity and a concise description features are described herein as part of the same or separate embodiments, however, it will be appreciated that the scope of the invention may include embodiments having combinations of all or some of the features described.

In the claims, any reference sign placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

What is claimed is:

1. A machine for moulding soft confectionery including:
   a conveyor system arranged for conveying a plurality of trays in a row, wherein each tray of the plurality of trays is located behind a preceding tray in a transportation direction of the conveyor system,
   a loading unit arranged for loading the trays onto the conveyor system,
   a filling unit arranged for filling a tray with a moulding powder,
   a depositing unit arranged for simultaneously depositing liquid confectionery in mould cavities of at least two trays, wherein the at least two trays are located in the row and at least one tray of the at least two trays is positioned behind at least one preceding tray of the at least two trays in the transportation direction of the conveyor system, and
   an unloading unit arranged for unloading the trays from the conveyor system.

2. The machine of claim 1, wherein the conveyor system is arranged for displacing the trays in a stroke-like fashion, wherein a stroke length of the movement of the conveyor system is equal to or larger than the combined length of the at least two trays measured in a movement direction of the conveyor system.

3. The machine of claim 1, wherein the at least two trays in which the liquid soft confectionery is deposited simultaneously are at least two successive trays within said single row of trays.

4. The machine of claim 1, wherein the filling unit is arranged for simultaneously filling at least two trays with the moulding powder.

5. The machine of claim 1, including a mould-forming unit arranged for forming the mould cavities of a tray in a moulding powder bed on said tray.

6. The machine of claim 5, wherein the mould-forming unit is arranged for simultaneously forming the mould cavities of at least two trays.

7. The machine of claim 1, including an emptying unit arranged for removing the soft confectionery from a tray.

8. The machine of claim 7, wherein the emptying unit is arranged for simultaneously removing the soft confectionery from at least two trays.

9. The machine of claim 7, wherein the emptying unit is arranged for upturning the tray or trays.

10. The machine of claim 1, wherein the unloading unit is arranged for stacking the trays onto a container.

11. The machine of claim 1, wherein the loading unit is arranged for de-stacking the trays from a container.

12. The machine of claim 1, further including a plurality of trays.

\* \* \* \* \*